United States Patent [11] 3,554,089

| [72] | Inventor | Armin Lang |
| | | Gmuund, Germany |
| [21] | Appl. No. | 813,932 |
| [22] | Filed | Apr. 7, 1969 |
| [45] | Patented | Jan. 12, 1971 |
| [73] | Assignee | Zahnradfabrik Friedrichshafen |
| | | Aktiengesellschaft |
| | | Friedrichshafen, Germany |
| | | a corporation of Germany |
| [32] | Priority | Apr. 13, 1968 |
| [33] | | Germany |
| [31] | | 1,755,225 |

[54] SERVOSTEERING SYSTEM
  8 Claims, 3 Drawing Figs.
[52] U.S. Cl. .................................................... 91/412,
  60/52, 180/79.2
[51] Int. Cl. .................................................... F15b 15/18,
  B62d 5/06
[50] Field of Search ................................. 91/412;
  60/525; 180/79.2

[56] References Cited
UNITED STATES PATENTS

| 446,799 | 2/1891 | Thorpe ....................... | 60/97H |
| 2,616,259 | 11/1952 | Quintilian ................... | 91/412X |
| 2,370,526 | 2/1945 | Doran ........................ | 60/53C |
| 3,249,173 | 5/1966 | Gordon ...................... | 60/525X |

Primary Examiner—Edgar W. Geoghegan
Attorney—Albert M. Zalkind

ABSTRACT: A dual cylinder hydraulic steering booster system is disclosed which has one primary servomotor normally operable, but which system also has a secondary servomotor automatically pressurized to supplement the power of the primary servomotor in response to an increase in steering required effort. A single servopump output feeds both servomotors; thus if only the primary servomotor is operating, the steering rate is rapid, but the rate is decreased when the secondary servomotor is pressurized should increased steering resistance be met; the booster force of both servomotors then being utilized.

PATENTED JAN 12 1971

INVENTOR:
A. Lang

ATTORNEY:

INVENTOR:
A. Lang
ATTORNEY:

SERVOSTEERING SYSTEM

For known prior art, reference is made to U.S. Pat. No. 3,249,173. considerably same Briefly, the invention provides a system which is unique in that it can be furnished as a unit comprising a conventional multiway valve and a pressure operated spool valve, in an arrangement of conventional components having a control or metering pump, a main or servopump, tank, and servomotors. The servomotors have mechanically connected pistons. Alternatively, the spool valve can be coupled to an existing system of conventional type utilizing a steering spindle operated multiway valve and worm gear construction which is common in booster steering arrangements.

In either case, the crux of the invention is the provision of the spool valve responsive for reciprocal actuation to pressure at either of its ends. The system utilizes a primary and secondary servomotor for actuating the steering mechanism wherein each servomotor is a double ended cylinder. The primary servomotor has conduit connections from its ends to respective pressure chamber ends of the spool valve, and is controlled by the usual multiway valve. The spool valve is pressure actuated against spring bias in either direction upon a predetermined pressure being reached in one end or the other of the primary servomotor. Pressure fluid connections from the servopump and tank are brought to the spool valve and the pressure fluid is controlled by the actuation of that valve to pressurize an end of the second servomotor, the connected pistons of the servomotors moving in unison.

Thus, either end of the second servomotor is automatically pressurized in response to a predetermined increase in pressure of the corresponding end of the first servomotor so that both servomotors have additive power to effect steering.

Since a common source of pressure fluid from the main pump feeds both servomotors it will be apparent that where the entire output of the main pump goes to the first servomotor the action of that servomotor will be rapid and at relatively low pressure. However, should the vehicle encounter steering resistance beyond a certain degree while being actuated by the first servomotor, the pressure in the respective end of that servomotor will build up quickly to that sufficient to actuate the spool valve whence flow from the main pump is then also fed to the second servomotor. However, the flow from the main pump is now divided and so the combined action of the two servomotors is relatively slow but at a higher pressure to compensate for the increased steering resistance.

A detailed description of the invention now follows in conjunction with the appended drawing in which.

Figures 1, 2:
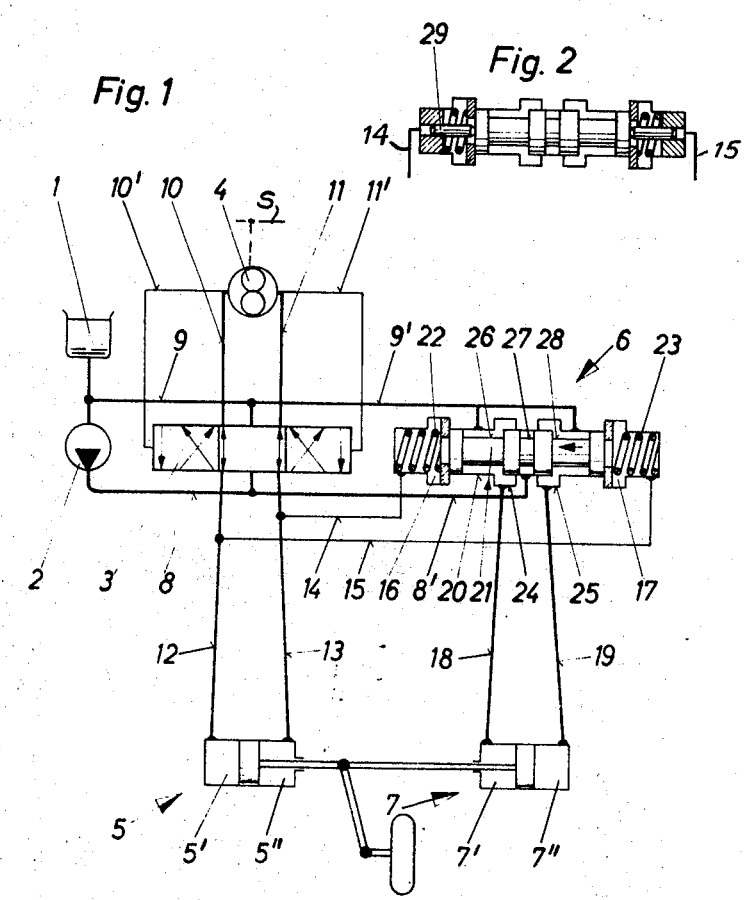
FIG. 1 is a diagram illustrating a modification of the system incorporating a metering pump.
FIG. 2 shows a modification of the valve spool.
Figure 3:
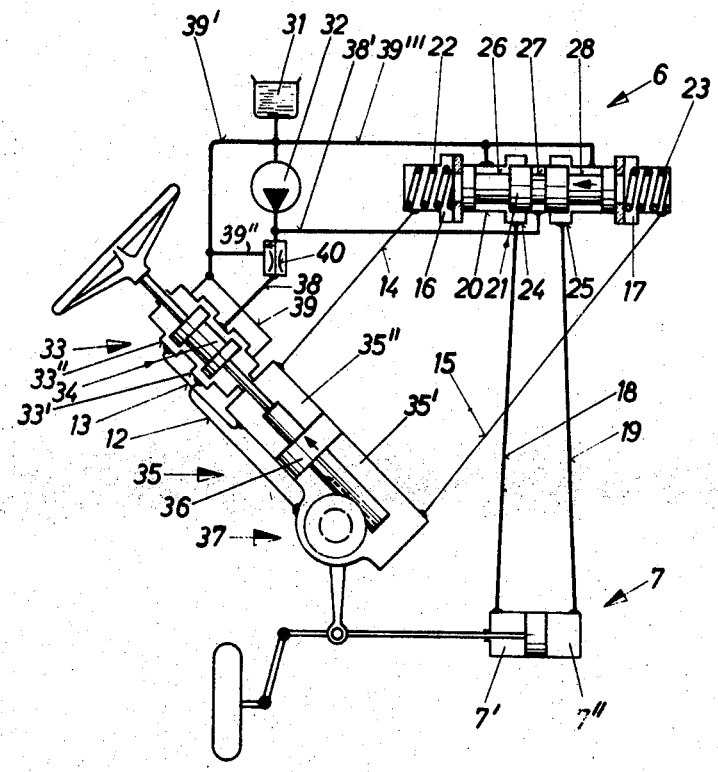
FIG. 3 is a diagram showing the manner in which the invention can be applied to an existing conventional booster steering system.

The systems of FIGS. 1 and 3 are shown in neutral condition for straight ahead steering, a single vehicle wheel being shown in FIG. 1 as exemplary of a wheel mounted for steering movement.

Referring to FIG. 1, the invention comprises an oil tank 1 having a conduit line connection as shown to the main pump 2 the output of which feeds to a conventional pressure operable primary valve such as the multiway valve 3 and also to the center groove 27 of a pressure operable secondary valve such as the spool valve 6. It will, of course, be understood that valve 6 is reciprocal in a bore 20 of a suitable housing, as diagrammatically illustrated, and in which bore the spool 21 of valve 6 is maintained centered by he spring bias of the springs 22 and 23 in the respective chambers 16 and 17. These chambers connect by the lines 14 and 15 to respective ends 5'' and 5' of the double ended primary servomotor 5, by connection to lines 12 and 13. The lines 12 and 13 feed and exhaust the servomotor ends, and connect to the multiway valve 3 communicating therethrough via lines 10 and 11 to the control or metering pump 4 at respective sides as shown. The pump 4 also connects via lines 10' and 11' to the pressure chamber ends of multiway valve 3 for actuation thereof in the usual manner when pump 4 is rotated by a steering spindle S.

Housing grooves 24 and 25 connect via respective lines 18 and 19 to respective ends 7' and 7'' of the secondary servomotor 7. A line 9–9' connects from the tank to the valve bore 20 in two regions surrounding respective grooves 26 and 28 of the valve spool 21. The center groove 27 of the valve spool is cut off from communication with grooves 24 and 25 in FIG. 1, so no pressure fluid output from pump 2 can reach the secondary servomotor 7 at this time from lines 8 and 8', which feed the main pump 2 output to valves 3 and 6. Thus, neither end of servomotor 7 is pressurized, and in fact, both ends at this time connect via bore grooves 24 and 25 to line section 9' which communicates with the spool grooves 26 and 28 whereby both ends of that servomotor are connected to exhaust, i.e., tank 1.

In this neutral position the entire output of main pump 2 passes via valve 3 to the sides of pump 4 in readiness to be metered therethrough in either direction depending upon direction of rotation of the steering spindle, and both ends of primary servomotor 5 are hydraulically blocked. Since the servomotor pistons are connected, secondary servomotor 7 is held against actuation. The hydraulic blocking of the piston of servomotor 5 is due to lack of rotation of pump 4, the steering spindle S being stationary.

In normal operation, rotation of the control pump 4 by a steering spindle will pressurize one end or the other of the primary multiway valve 3 causing it to shift so as to direct pressure fluid from main pump 2 to the control pump the output of which with increase of pressure is then directed through multiway valve 3 to one end or the other of the primary servomotor 5. This effects a left or right turn of the vehicle wheels depending upon the direction of rotation of the control pump. The end of servomotor 5 which is not pressurized exhausts via multiway valve 3 to line 9 and the tank.

The above components and operation are generally known and the particular invention herein resides in combining with the system a secondary valve 6 either end of which is exposed to pressure via lines 14 and 15, having chambers 16 and 17 subject to a pressure differential in the servomotor ends 5' and 5''. Thus, if due to an encounter with steering resistance the steering movement slows up there is an increased differential pressure which will shift valve spool 21 in one direction or the other depending upon the direction of the pressure force acting in the lines 12 and 13, which differential pressure must be sufficient to overcome the bias of the spring in the chamber 16 or 17.

From the preceding description it will be apparent that normally only the primary servomotor 5 is effective and for as long as a predetermined pressure in either cylinder end is not reached sufficient to overcome bias of respective spring 22 or 23. In such case, the output of servopump 2 is at a low pressure and relatively rapid rate. However, assuming a predetermined pressure is reached, for example, in chamber 5', such pressure is immediately transmitted via lines 12 and 15 to chamber 17 thus shifting spool valve 21 to the left as indicated by the arrow thereon. In such case, pressure fluid via line 8' is then shunted via groove 27 to groove 24 and thence to the secondary servomotor end 7' and servomotor 7 then becomes effective in the same direction. The other end of the secondary servomotor exhausts via line 19 through groove 25 and around spool groove 28 to the tank line 9'.

The reverse operation occurs if the predetermined pressure is felt in cylinder end 5'.

Since it may be desirable to vary the extent of predetermined pressure to which the valve spool is responsive in different systems, the modification of FIG. 2 illustrates a simple construction whereby this can be effected. Thus, the lines 14 and 15 conduct pressure fluid to the ends of reduced diameter pins such as 29. The cross-sectional area of the pins exposed to pressure is considerably smaller than that of the spool ends illustrated in FIG. 1. Therefore, a higher predetermined pressure would be necessary assuming the same spring strength.

Referring now to FIG. 3, the modification therein illustrates how the present invention can be added to an existing conventional booster steering system wherein the primary servomotor 35 is controlled by a spool valve 33 responsive to rotation of the illustrated steering wheel in a well-known manner. Thus, the piston 36 operates between primary servomotor cylinder ends 35' and 35" in a direction controlled by movement of valve spool 34 so that fluid follows paths effected by housing grooves 33' and 33" and valve spool 34.

The piston 36 is threaded on the spindle as a nut and its travel reciprocates its shaft to rotate a gear segment of the steering mechanism 37, all in a well-known manner.

The pressure fluid connections are from the servopump 32 to the conventional flow regulating relief bypass valve 40 to the housing of spool valve 33 via line 38 whence lines 12 and 13 conduct fluid pressure to opposite ends of the primary servomotor 35, exhaust likewise being through the same lines depending on the direction of movement of piston 36. The housing of valve 33 also connects via line 39 at opposite ends of the valve spool 34 to the tank 31 via line 39'. A shunt connection 39" from valve 40 extends to line 39'.

The above system is entirely conventional in all its components, and in its operation, for reversibly pressurizing and exhausting the cylinder ends of the primary servomotor 35 and details of operation need not be set forth. In FIG. 3 a neutral position of steering is shown wherein it will be obvious that pump 32 and both ends of the servomotor 35 are connected to tank 31 for circulatory flow via lines 38 and 39.

The components of the present invention are illustrated in FIG. 3 using the same reference characters as heretofore described in connection with FIG. 1 and accordingly such details need not be repetitiously described. The conduit lines 14 and 15 connect to the pressure chambers of spool valve 6 from the ends of the primary servomotor 35 and pressure fluid is brought to spool valve 6 via line 38' upstream of valve 40, exhaust from the spool valve 6 going via line 39''' to tank 31.

The operation is essentially the same as previously described. In this case the steering wheel direction of rotation controls the direction of movement of piston 36 via the threaded connection with the steering spindle which provides manual steering power, but primarily by actuating valve spool 34 to pressurize piston 36. It will be apparent in the event of a predetermined pressure rise in cylinder end 35' or 35" the spool valve 6 will be shifted in a direction to move the piston of the secondary servomotor 7 in aid of piston 36. Thus if piston 36 is moving in the direction of the arrow a predetermined pressure is reached in cylinder end 35' then valve spool 21 will be shifted to the left as shown by the arrow thereon to pressurize cylinder end 7'. It will be noted that the pistons of both servomotors are mechanically linked via the steering mechanism so that synchronization of movement of the pistons is assured.

Reverse movement of the servomotors takes place in the event of reverse rotation of the steering wheel assuming that a predetermined pressure rise is felt in cylinder end 35'.

Various well-known details in conventional systems have not been illustrated in conjunction with FIG. 3, for example, the centering spring arrangement for valve spool 34 and the threaded coaction between piston 36 and the steering spindle; likewise the actual gear teeth on the shaft of piston 36 and in the steering mechanism 37 have also been omitted.

In FIG. 1 the pressure fluid line 8 is not connected to return line 9. Further, in FIG. 3 the pressure fluid line 38' is not connected to the return line 39'''. Accordingly the secondary valve 6 is operable in parallel with the primary control valve 3 in either modification of the invention. There is also the advantage that pressure fluid to the secondary valve is cut off in the neutral position of that valve and there is therefore no loss due to moving of oil until the secondary valve is actually shifted.

I claim:

1. A hydraulic steering booster system comprising:
    a primary control valve and a primary servomotor connected thereto to be pressurized therethrough;
    a secondary control valve connected to said primary servomotor and actuatable in response to a predetermined pressure therein;
    a secondary servomotor connected to said secondary control valve to be pressurized therethrough in response to said predetermined pressure;
    including a source of pressure fluid communicating with and controllable through said primary valve by an operator to pressurize said primary servomotor and communicating with said secondary valve for pressurizing therethrough said secondary servomotor;
    whereby at steering resistance loads below that which effect said predetermined pressure in said primary servomotor said source feeds only to said primary servomotor for actuation at a relatively rapid rate and at low pressure, but wherein said predetermined pressure is reached upon an increase in steering resistance to actuate said secondary valve so that said source then feeds to said secondary servomotor also, said servomotors then being actuated simultaneously at a relatively slower rate and at a higher pressure.

2. A hydraulic steering booster system as set forth in claim 1, each of said servomotors being double ended and having mechanically connected pistons.

3. A hydraulic steering booster system as set forth in claim 1, said secondary control valve being a multiway valve and comprising a reciprocal valve spool, a housing for said spool effecting pressure chambers at respective ends thereof; said pressure chambers communicating with respective ends of said primary servomotor, including means biasing said spool to a neutral position whereat pressure fluid thereto is blocked from communicating with respective housing grooves.

4. A hydraulic booster steering system as set forth in claim 3, said spool having three grooves in symmetrical array and said housing having coacting grooves for flow thereinto upon actuation of said spool; said source of pressure fluid communicating with the center groove of said spool and said secondary servomotor being double ended and the ends thereof communicating with respective housing grooves.

5. A hydraulic steering booster system as set forth in claim 1, said secondary control valve comprising a reciprocal valve spool and means therefore effecting chambers for pressure communication to the ends of said spool from said primary servomotor, said chambers having pressure actuatable pistons exposed to said primary servomotor pressure and disposed to abut respective ends of said spool for reciprocation thereof and having a cross sectional area less than that of said spool; including means for biasing said spool against pressure actuation in either direction until a predetermined pressure becomes operative on either of said pistons.

6. A hydraulic steering booster system as set forth in claim 1, said primary control valve and primary servomotor having hydraulic circuitry comprising a flow regulating valve connected intermediate said source of pressure fluid and said primary control valve wherein said source of pressure fluid communicates from a point upstream of said latter valve to said secondary control 7. As supplemental power arrangement for a hydraulic steering booster system installation having a source of pressure fluid and wherein said installation comprises an arrangement having a steering spindle operated multiway valve and a servomotor controlled thereby and mechanically connected to operate a steering mechanism; said supplemental power arrangement comprising a pressure operable multiway valve and means for connection thereof with the source of pressure fluid and having means operative to actuate said latter valve responsive to a predetermined pressure in said servomotor; and another servomotor communicating with said latter multiway valve for pressurizing control thereby responsive to actuation of said latter valve; and connection means between the pistons of said servomotors.

8. A supplemental booster steering unit for attachment to an existing booster servomotor steering system and comprising a multiway valve and means for connecting said valve to the source of fluid pressure which feeds said existing system; a servomotor having connections to said multiway valve to be pressurized therethrough upon actuation thereof; means for biasing said multiway valve to a neutral position comprising springs requiring a predetermined force to effect flexure thereof and means providing pressure chambers for said multiway valve communicating with the servomotor of said existing system whereby said multiway valve is actuated upon predetermined pressure in said latter servomotor to effect operation of the servomotor controlled thereby, and means to connect the piston thereof to the piston of said existing system.